S. E. HEWES,
Assignor to J. JENKS.
STEAM AND AIR EJECTOR.
No. 10,020. Reissued Jan. 31, 1882.
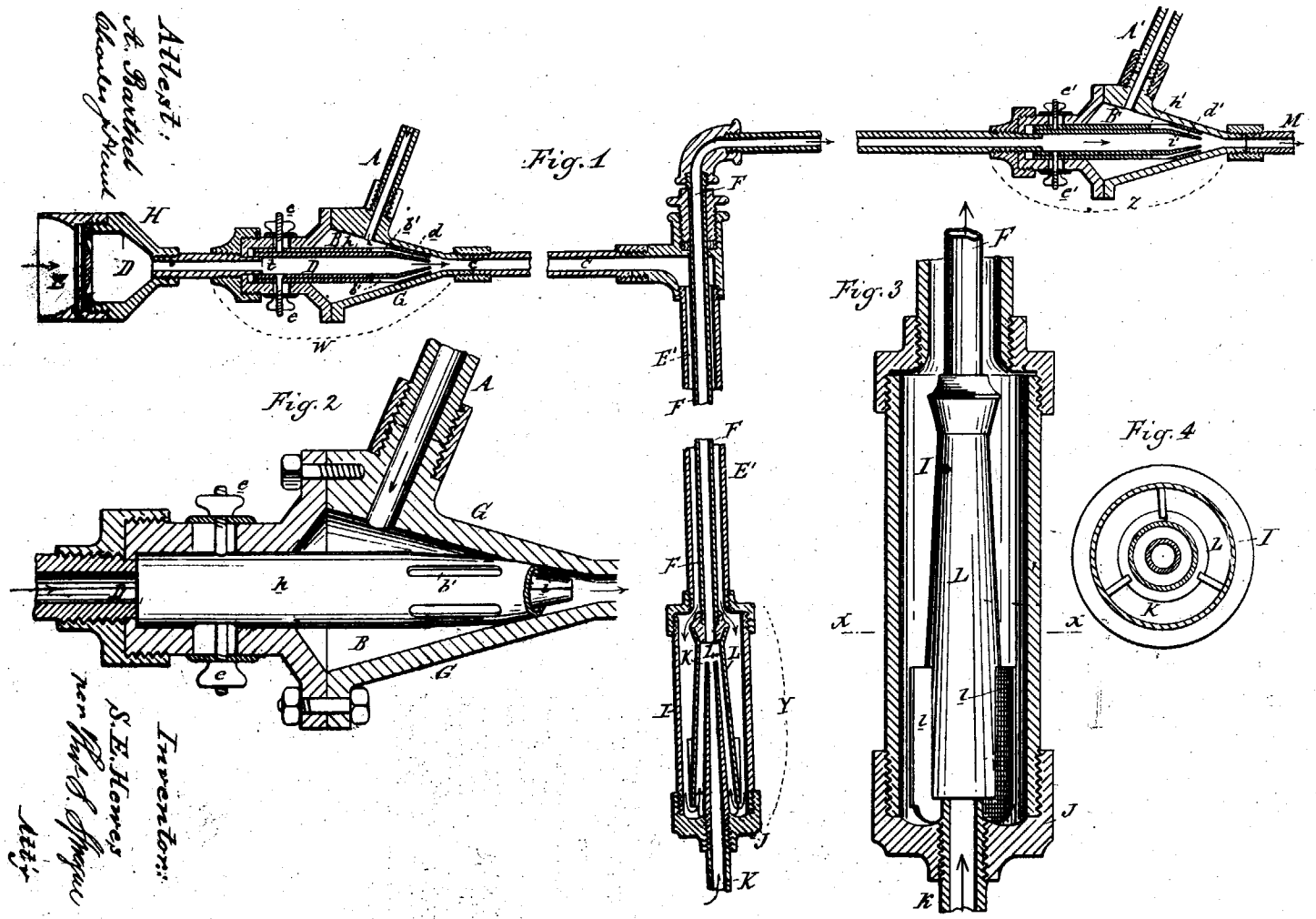
Attest:
A. Barthel
Charles J. Hind
Inventor:
S. E. Hewes
per Wm. S. Sprague
Att'y

UNITED STATES PATENT OFFICE.

SHUBAEL E. HEWES, OF HOOPESTON, ILLINOIS, ASSIGNOR TO JAMES JENKS, OF DETROIT, MICHIGAN.

STEAM AND AIR EJECTOR.

SPECIFICATION forming part of Reissued Letters Patent No. 10,020, dated January 31, 1882.

Original No. 59,921, dated October 30, 1866. Application for reissue filed November 23, 1881.

*To all whom it may concern:*

Be it known that I, SHUBAEL E. HEWES, formerly of Albany, in the county of Albany and State of New York, but now of Hoopeston, in the county of Vermillion and State of Illinois, have invented a new and useful Improvement in Ejectors; and I do hereby declare the following to be a full, clear, and exact description of the same, sufficient to enable one skilled in the art to which the invention appertains to make use of it, reference being had to the accompanying drawings, which form a part of this specification, and in which:—

Figure 1 is a central vertical section. Fig. 2 is an enlarged view of one of the injectors or ejectors. Fig. 3 is an enlarged view of that portion of the apparatus near the bottom of the well where the liquid enters the inner upcast pipe or inside tube. Fig. 4 is a transverse section on line *x x*, Fig. 3.

This device consists in the arrangement and combination of cylinders and tubes to be operated by compressed air or steam, as hereinafter described, for the purpose of acting upon, moving, and forcing liquids from any reservoir thereof in any direction therefrom from horizontal to perpendicular, and vice versa. The conic chambers containing the internal structure, hereinafter described, are attached to double tubing, one inclosing the other, the compressed fluid passing in one direction through the space between the tubes and in the other direction within the inner tube. The conic chambers are made as shown by the accompanying drawings, and attached to the valve and to the tubing by socket or couplings. The shell is made in two parts to facilitate the means of making the most perfect finish inside. In this shell are fitted two adjustable tubes, the outer one adjustable to the shell, the inner one adjustable to the inside of the outer tube. These tubes are movable by means of the set-screws *e e'*. The inner tube has four slits at the small end. The outer tube has four slots through it. The aforesaid forms, fittings, and manner of moving said tubes are designed to secure the most ready adjustment of the same to the internal surface of the shell and to the pressure and force exerted upon and within them by the action of the steam or compressed air. The velocity and pressure of the steam at the outset exhaust in the rear of its movement, causing the atmospheric air to rush in at the valve, and the steam is forced along the space between the tubes into the enlargement at the end of the outside tube, and turned upward, and, passing the mouth of the well-pipe, raises the liquid through the inside tube. By the action of the ejector the liquid is forced out with great velocity. The combined action is compression at one end and exhaustion at the other, the actions being upon the stream at the same time and in the same direction, and this action is continuous, as is the application of the steam or compressed air.

The construction and operation are as follows:

The steam or compressed air enters with a constant pressure at the pipe A and passes to the chamber B, from whence it issues in annular jets into the pipe C, which leads to the downcast air or steam tube E' of the well which surrounds the upcast central tube, F, which conducts the liquid and fluid to the surface. The agency in this elevation may be steam or compressed air, but I shall speak of it as steam for convenience. The steam passes from the chamber B through the slots *b'* in the nozzle *h*, and then through the annular orifice *d*, between the nozzles *h* and *i*, and into the pipe C. The nozzle *h* may be so far withdrawn as to leave an annular opening between it and the wall G of the chamber B, so that the steam is injected in two annular concentric jets around the stream of atmospheric air entering at the valve E into the tube D, and which is drawn in by the partial exhaustion caused in the rear of and within the jets of steam.

The means for setting the nozzles *h i* relatively to each other and to the conical mouth of the chamber B is afforded by the set-screws *e e*, which pass through the walls G of the chamber B. The inner nozzle, *i*, is slit, so as to render it contractible or expansible, according to the relative pressure of the steam which surrounds it or the liquid or fluid which passes through it. Thus the two annular jets of steam and the central stream of air fill the pipe C with steam and air in a compressed state, and pass down the pipe E′, around the pipe F, into the chamber I, and then, passing around the lower end of the pipe L, are deflected upward around the pipe K. The chamber I is supported by the socket J, through whose center passes the pipe K, which admits the liquid from the well and discharges it upward into the pipe F, as a partial exhaustion is formed at the nozzle K by the annular jet from the pipe E′, which surrounds the pipe K.

The section of tube L has a socket at its upper end, which supports the lower end of the pipe F, the latter being provided with a collar which is seated in a conical enlargement forming a socket. From this the tube F may be lifted as required for examination and repairs, and lowered again into position. The section of tube L has flanges *l*, which rest upon the socket J, so that the lower end of L does not touch the socket J, and passage is afforded for the steam, air, water, &c., which, having passed down pipe E′, are received upwardly into pipe F. The pipe F, after reaching the surface, is bent horizontally, and enters an ejector apparatus similar to the injector first described. This ejector has a body of steam introduced at the pipe A′ to the chamber B′, which issues by slots in the nozzle *h′*, in an annular jet between *h′* and the internal elastic nozzle *i*, into the discharge-pipe M. The same mode of adjustment by set-screws *e′* is afforded for the nozzles in the ejector as is provided in the injector. All these devices act in conjunction and combination to produce the effect of the ejection of the liquid which rises in the induction-pipe K from the well. They may be described, in the order followed, as an injector, W, a projector, Y, and an ejector, Z. The first introduces by injection the compressed fluid. In the second the said fluid draws up the liquid from the well and elevates it in the standpipe; and the third device, the ejector, forcibly discharges it, and by partial exhaustion in its rear assists in raising the liquid and urging the current.

This apparatus in its combined form may be used as a device for raising oil or water from deep wells, or the devices combined or separately as an injector of feed-water for steam generators or boilers. The term "ejector" in this relation is applied to the device when it is used for raising a liquid from a well or reservoir, and "injector" when it is spoken of in relation to the discharge of the liquid either into a tank or close vessel, such as a boiler.

Having thus described my invention, what I claim as new, and desire to secure by Letters Patent, is—

1. In an injector, the combination of the injector W, projector Y, and ejector Z, operating together substantially as described.

2. In an injector, the adjustable nozzles *h i*, operating substantially as described.

3. In an ejector, the expansible and contractible slit nozzle *i′*, constructed and operating substantially as and for the purpose described.

4. In an injector, the slotted nozzle *h′*, in combination with an outer casing and an inner nozzle, substantially as described.

5. In an ejector, the combination, with the chamber I and the socket J, of the pipes K and L, and the flanges *l* within said chamber I, substantially as and for the purpose specified.

6. In an injecting device, the combination, with an ejector having a supply-pipe, of an internal tube affording communication between said ejector and an injector, substantially as and for the purpose specified.

SHUBAEL E. HEWES.

Witnesses:
JAMES MCFERREN,
E. C. GRIFFITH.